United States Patent [19]

Lovett

[11] 4,196,803
[45] Apr. 8, 1980

[54] SELF-ALIGNING ROLLER FOR BELT CONVEYORS

[76] Inventor: John R. Lovett, 23604 Lake Rd., Bay Village, Ohio 44140

[21] Appl. No.: 773,965

[22] Filed: Mar. 3, 1977

[51] Int. Cl.$^2$ ............................................. B65G 39/16
[52] U.S. Cl. ...................................... 198/806; 226/21; 226/192
[58] Field of Search ....................... 198/806, 808, 782; 193/37, 35 C, 35 R, 35 A; 226/21, 192; 308/194

[56] References Cited

U.S. PATENT DOCUMENTS

| B580,379 | 4/1976 | Bolton et al. | 193/35 A |
|---|---|---|---|
| 1,189,611 | 7/1916 | Morse | 226/192 |
| 1,833,180 | 11/1931 | Robins | 198/806 |
| 2,262,325 | 11/1941 | Kendall | 198/806 |
| 2,330,923 | 10/1943 | Robins | 198/806 |
| 2,655,251 | 10/1953 | Bankauf | 198/806 |
| 2,769,515 | 11/1956 | Thomas et al. | 193/35 A |
| 2,865,688 | 12/1958 | Lemont | 308/194 |

*Primary Examiner*—Robert B. Reeves
*Assistant Examiner*—Douglas D. Watts
*Attorney, Agent, or Firm*—Isler and Ornstein

[57] ABSTRACT

A roller mounted for universal angular movement relatively to its nominal longitudinal axis of rotation so as to be angularly displaced by the weight and movement of the conveyor belt when the conveyor belt shifts away from running true. This angular displacement brings the rotating roller into engagement with reaction faces provided on the frame of the conveyor and causes the roller to be reactively displaced in a direction to restore the belt to running true.

10 Claims, 8 Drawing Figures

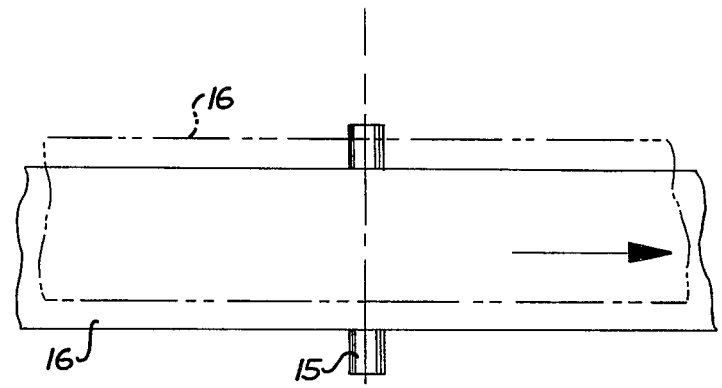
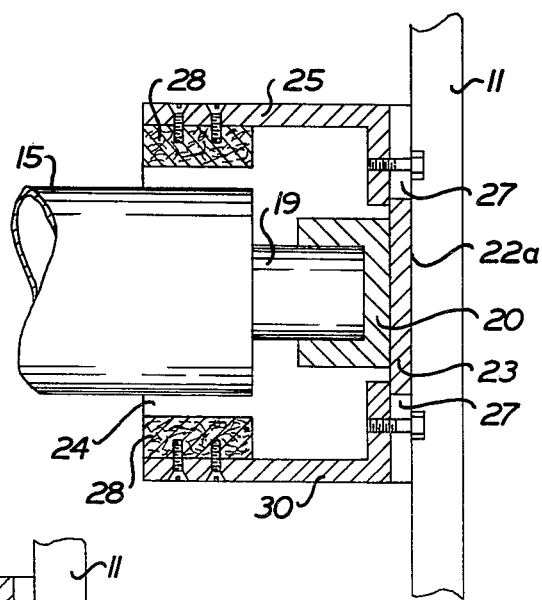
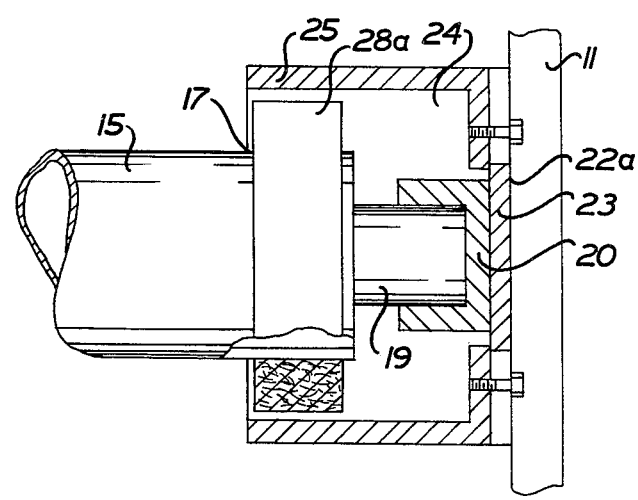

SELF-ALIGNING ROLLER FOR BELT CONVEYORS

BACKGROUND OF THE INVENTION

Endless belt conveyors typically utilize rubber or fabric or composition belts of flexible material trained over cylindrical rollers which are supported in a suitable framework. The belt is driven at a desired speed by one or more of the rollers, with a series of idler rollers underlying and supporting the belt both on the load flight of the belt and the return flight of the belt.

Due to numerous variable conditions and factors, the belt will not always run true and will tend to shift toward one side or the other of the conveyor and bring the edges of the belt into interference with the conveyor frame members with consequent injury and costly damage to the belt.

The invention is directed to means for monitoring and restoring the belt to running true before the belt has shifted sufficiently to rub against the conveyor framework or otherwise to cause damage to the belt or interruption of the material handling process.

The problem has attempted to be solved by the use of adjusting means on the conveyor rollers whereby an operator can occasionally modify the axis of rotation of a roller to compensate for an observed consistent shift of the conveyor belt in one direction. Somewhat elaborate electronic or electrical sensing and roller control means have also been devised to monitor the shift of the belt and adjust the rollers to restore the belt to running true.

SUMMARY OF THE INVENTION

The invention contemplates the use of one or more rollers which are mounted for universal angular displacement relatively to the nominal axis of rotation of the roller, which is ordinarily normal to the direction of travel of the conveyor belt.

It is the primary object of the invention to provide means whereby such a roller will monitor and respond to lateral shifting of the belt as it deviates from a running true position during its travel.

It is a further object of the invention to provide means which utilizes the force of roller rotation for automatically positioning one or more of such rollers in a manner to compensate for the lateral shift of the conveyor belt and restore it to running true.

It is a further object of the invention to provide such belt aligning means which will be operative and effective regardless of whether the belt is shifting toward one side or the other side or whether the belt is moving in one direction of travel or the opposite direction of travel.

Another object of the invention is to provide means of the character described which are adjustable to control their sensitivity of response and the frequency of operation.

Other objects and advantages will become apparent during the course of the following description and with reference to the following drawings in which like numerals are used to designate like parts throughout the same.

BRIEF DESCRIPTION OF THE DRAWING

FIG. 4 is a schematic fragmentary plan view of the return flight of the conveyor belt supported by the self-aligning roller of FIG. 3, and showing in phantom lines a condition of lateral displacement of the belt from its running true condition.

FIG. 7 is a fragmentary cross-sectional view, similar to the right-hand end of FIG. 3, showing a modified form of the invention.

FIG. 8 is a fragmentary cross-sectional view, similar to FIG. 7, but showing still another modified form of the invention.

DESCRIPTION OF THE PREFERRED EMBODIMENTS

Figure 1:
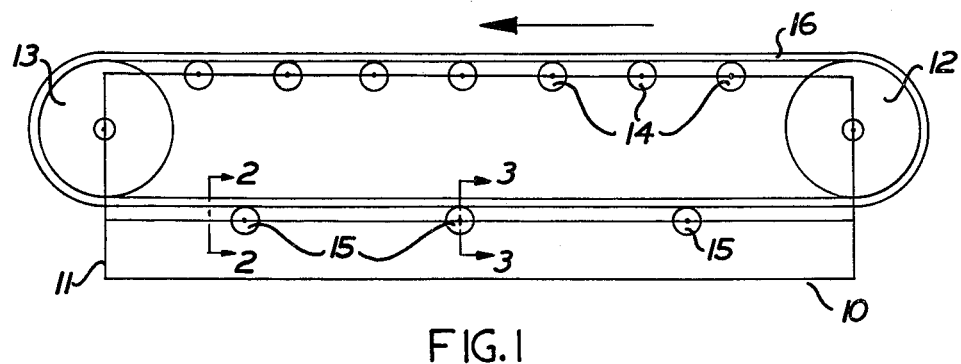
FIG. 1 is a schematic illustration in side elevation of a representative form of endless belt conveyor utilizing the principles of the invention.

Referring more particularly to FIGS. 1-6 of the drawing, there is schematically illustrated in FIG. 1 a representative form of endless belt conveyor 10 having a suitable supporting framework 11 for a head pulley 12, a tail pulley 13, load carrying idler rollers 14 and return idler rollers 15. A flexible, endless belt 16 is trained over the pulleys 12 and 13 and overlies and rests upon the spaced idler rollers 14 and 15. Ordinarily, either the head pulley 12 or the tail pulley 13 is powered (not shown) to drive the belt in one direction of travel or the other. In some instances where the function of the belt conveyor is to move a load from a high elevation to a substantially lower elevation, it may not be necessary to power drive the belt, as it will travel in the desired direction under the influence of gravity acting on the load being carried. Regardless of whether the belt 16 is power driven or gravity actuated and regardless of whether the pulleys and rollers be designated as power driven or idler, it will be apparent during the course of the following description that the principle of operation of the self-aligning roller can be applied for effective control of the tendency of the conveyor belt to shift to one side or the other from its running true position.

Figure 2:
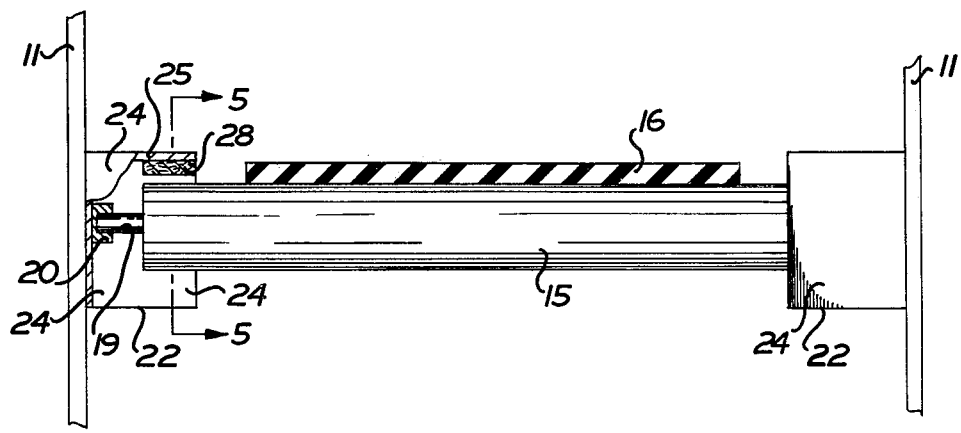
FIG. 2 is an enlarged cross-sectional view of the return flight of the conveyor belt, taken as indicated on line 2—2 of FIG. 1.
Figure 3:
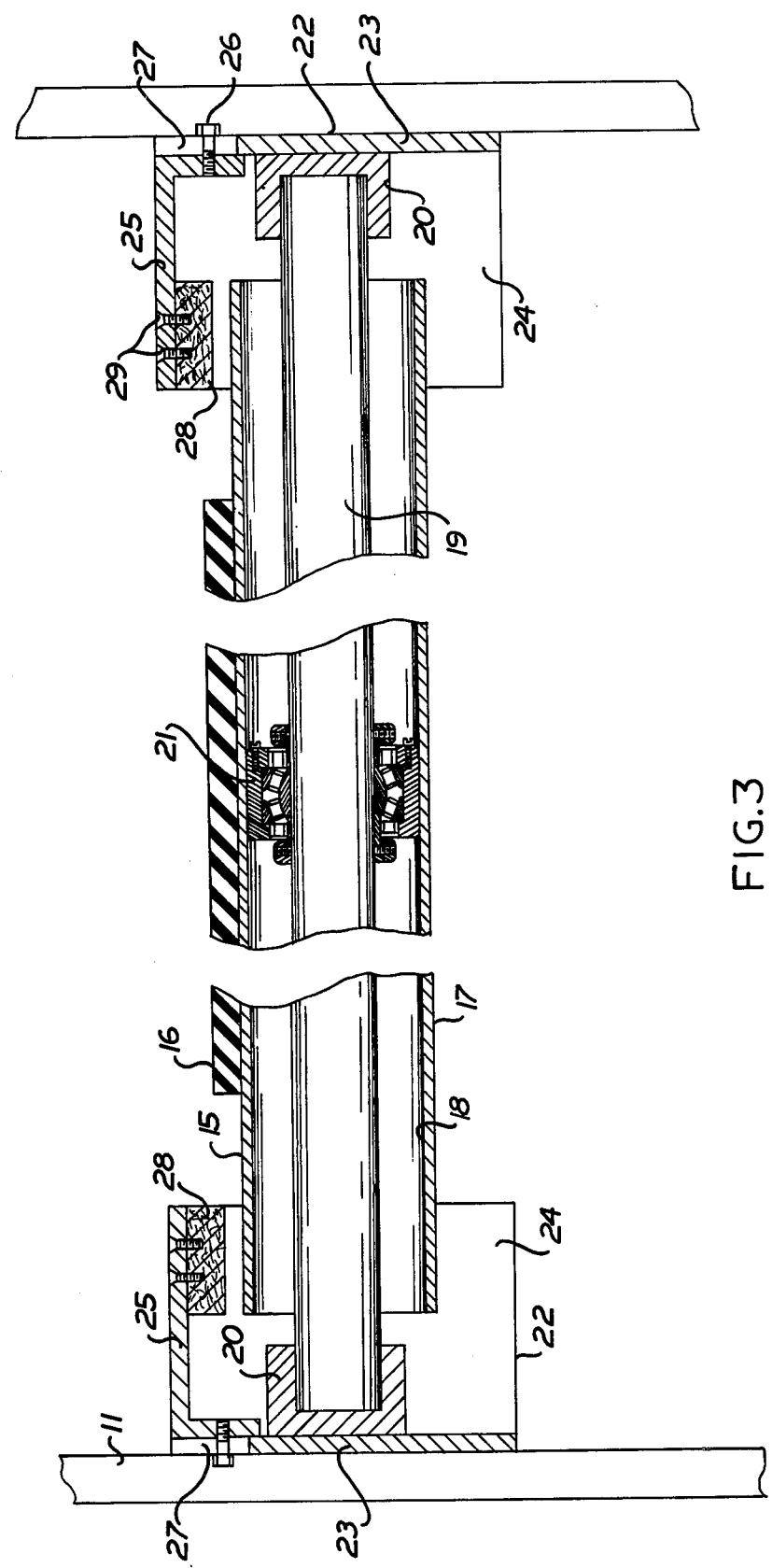
FIG. 3 is an enlarged cross-sectional view of a self-aligning roller, taken as indicated on line 3—3 of FIG. 1.

As best shown in FIGS. 2 and 3, a return idler roller 15, which may be identical in structure with a roller 14, is a cylindrical tube having an external wall surface 17 and an internal wall surface 18. Ordinarily, stub shafts or an axle 19 is suitably fixed to the roller and journalled for rotation in suitable bearings mounted on the framework 11 of the conveyor. In the form of self-aligning roller illustrated in FIGS. 2 and 3 of the drawings, the shaft or axle 19 is not fixed to the roller 15, but extends longitudinally axially thereof with its opposite ends suitably supported, as at 20, by the framework of the conveyor. The ends of the axle 19 need not be journalled for rotation, but it does not interfere with the operation of the self-aligning roller if the supports 20 are bearings, although there is no necessity therefore.

A self-aligning bearing 21 is secured within the roller 15, centrally thereof, to provide rotation journal means for the roller on the axle 19 at the midpoint of the roller. The bearing 21 is a roller bearing having a spherical form of race which permits swiveling or angular displacement of the roller in any direction relative to the nominal axis of rotation of the roller as defined by the longitudinal axis of the axle 19 in which the axle is journalled for relative rotation of the roller 15. Although the self-aligning bearing 21 has, by the nature of its structure, a limited range of permissible angular movement which may be on the order of 5° or less, the structure of the self-aligningroller 15 is such that its monitoring and control function is operative and effective well within the available range of swivel movement permitted by the structure of the bearing 21, so that from a functional and operative standpoint, the bearing 21 permits universal angular displacement of the roller 15 relatively to the axle 19 in all directions within the operative range of the self-aligning function of the roller 15.

Secured to the frame 11, so as to overlie each end of the roller 15 is an abutment assembly 22 which may be in the form of an open-ended box-like structure having a single end wall 23, a pair of spaced side walls 24 which are directed inboard of the roller 15 and a top wall 25 which also extends inboard of the roller 15. The previously mentioned support 20 for the axle 19 may conveniently be secured to the inner face of the end wall 23. The side walls 24 and the top wall 25 may serve as reaction faces which, as will appear more fully hereinafter, are engageable by one or both ends of the roller 15 when the belt 16 shifts from a running true position.

Preferably, the top wall 25, which is the primary reaction face of the abutment assembly, is removably and adjustably connected to the remainder of the abutment assembly 22, as by securing the top wall 25 by means of threaded fasteners 26 to the end wall 23 through slots 27 which are provided adjacent the upper end of the wall 23. This arrangement permits the position of the top wall 25 relatively to the adjacent end of the roller 15 to be adjusted, when desired or required, to establish a selected spacing between the top wall 25 and the external wall surface 17 of the underlying end of the roller 15. This arrangement also permits the top wall 25 to be completely removed from the abutment assembly 22 for purposes of repair or replacement, without disturbing the remaining members or elements of the assembly. The mounting arrangement described for the top wall 25 with respect to the end wall 23 can also be utilized for the side walls 24, if desired, but is ordinarily not needed. In the form of invention shown in FIGS. 2 and 3, no bottom wall is provided on the abutment assembly thus leaving the bottom of the assembly open to permit any debris, dirt or the like to freely escape from the assembly 22, without excess accumulation therein. A high friction surface 28 which may be in the form of a pad of sintered metal or brake lining material or the like, is preferably provided on the under surface of the top wall 25 and may be detachably secured thereto by fasteners 29 so as to permit removal and replacement of the friction surface 28 when required. Similar high friction surfaces 28 may be provided on the side walls 24, but are not ordinarily necessary.

Figure 5:
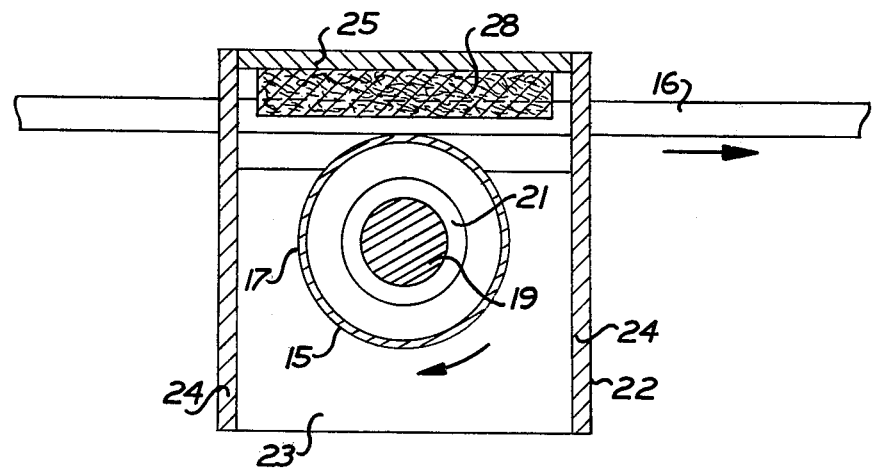
FIG. 5 is an enlarged cross-sectional view, taken as indicated on line 5—5 of FIG. 2 and showing the position of the various parts when the belt is running true.
Figure 6:
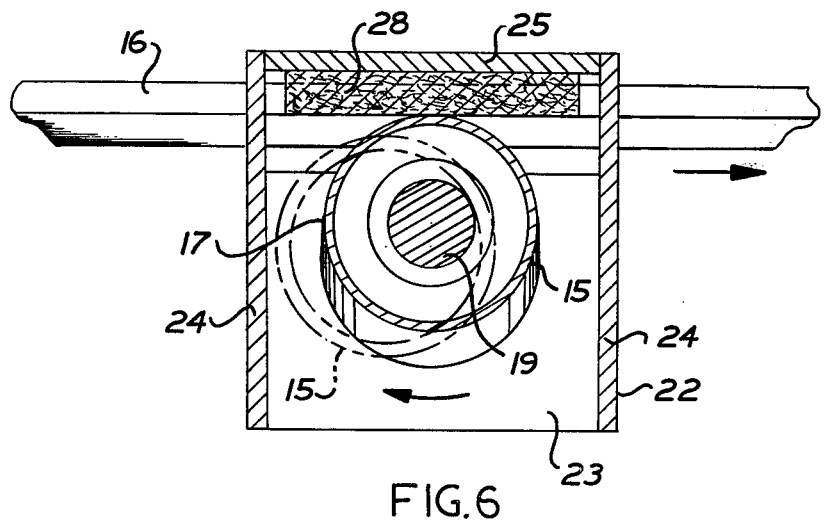
FIG. 6 is a view similar to FIG. 5 and showing the relative position of the various parts when the belt has shifted from the solid line position of FIG. 4 to the phantom line position of FIG. 4.

Referring to FIGS. 4, 5 and 6 of the drawings, the operation of the self-aligning roller will now be described. FIG. 4 is a schematic plan view showing the belt 16 running true on the conveyor and being supported by a roller 15. As shown in solid lines in FIG. 4, the belt 16 is traveling in a direction normal to the nominal axis of rotation of the roller 15 and is positioned centrally over the roller 15, substantially equidistant from the ends of the roller. As shown in FIG. 5, the belt is traveling in the direction indicated by the arrow and rests upon the external wall 17 of the cylindrical roller 15 to cause rotation of the roller 15 about the axle 19 in the clockwise direction indicated by the arrow. The weight of the belt is balanced and distributed substantially equally on either side of the midpoint of the roller 15, as defined by the position of the self-aligning roller bearing 21. Under these conditions, with the belt running true, the axis of rotation of the roller 15 is parallel to the longitudinal axis of the axle 19 and the opposite ends of the roller 15 remain spaced from and out of contact with the reaction faces presented by the abutment assembly 22.

Due to any one or a combination of several factors, the belt 16 will not maintain the solid line position shown in FIG. 4, but instead will tend to shift toward one side or the other and become laterally displaced, such as indicated in phantom outline in FIG. 4. Such a shift creates an imbalance of the belt weight on the underlying roller 15, whereby the greater weight of the belt to one side of the midpoint of the roller 15 exerts a leverage effect on that end of the roller to angularly displace it downwardly while at the same time causing corresponding elevation of the opposite end of the roller 15, as indicated in FIG. 6. When the end of the roller 15 has been elevated sufficiently to contact the reaction face represented by the top wall 25 and its high friction surface 28, the clockwise rotation of this end of the roller 15 against the stationary reaction face causes a "kick" or reaction displacement of the end of the roller in a direction opposite to the direction of travel of the belt 16. The axis of rotation of the roller 15 thus is shifted angularly relatively to the nominal axis of rotation defined by the axis of the axle 19, so that the axis of rotation of the roller is no longer normal to the direction of travel of the belt but is slightly angular with respect thereto in a direction to urge the belt away from the side toward which it has shifted and restore it to a position of running true. As the belt shifts back from the phantom line position of FIG. 4 to the solid line position of true travel, the weight imbalance on the underlying roller 15 is diminished gradually as the belt moves toward the running true midpoint position and the previously elevated end of the roller 15 disengages from the reaction face and restores itself, in response to the belt movement, to an axis of rotation parallel to the axis of the axle 19.

If the lateral outboard shift of the belt 16 is in a direction opposite to that indicated in phantom outline in FIG. 4, then it will be understood that the end of the roller 15 which was previously described as being elevated, will now be subjected to the weight imbalance of the belt and the opposite end of the roller 15 will be elevated to a level of contact with the reaction face provided at that end of the roller 15. In either case, the elevated end of the roller is displaced in a direction opposite to the direction of travel of the belt 16, so that it becomes a trailing end in contrast to the now leading opposite end of the roller 15. The operation then is as previously described with the angular displacement of the axis of rotation of the roller 15 serving to urge the belt 16 back toward a running true position.

It will be noted that the described form of self-aligning roller 15 performs two basic functions which are additional or supplementary to its ordinary function as a roller support for the belt 16. Firstly, the self-aligning roller is sensitive to any weight imbalance caused by lateral displacement of the conveyor belt from a midpoint travel position. By this means, the self-aligning roller senses when the belt is not running true. Secondly, when the magnitude of this sensed condition of imbalance attains a predetermined value, the self-aligning roller reacts to angularly displace its own axis of rotation to a position which will direct the belt toward running true. At any given speed of belt travel, the rapidity of response of the self-aligning roller is a function of the leverage force imposed upon the elevated end of the roller by the weight imbalance imposed upon the opposite end of the roller. Thus the quickness or speed at which the roller will respond to control the shift of the belt 16 is a function of the rapidity with which the shift of the belt occurs. Similarly, the restoring reaction force which is imposed upon the elevated end of the roller is a function of the magnitude of the weight imbalance which the belt creates upon the roller. If the lateral shift of the belt 16 is very gradual, then the response of the roller is slower than it would be if the shift of the belt is sudden or accelerated. Likewise, the reaction force or kick on the roller is greater when the belt has shifted considerably or does not respond quickly to the roller control action than it is when the extent of shift of the belt is more moderate and the belt responds quickly to the displaced control position of the roller 15.

The spacing of the reaction face provided by the top wall 25 is also a factor in establishing the magnitude of weight imbalance on the roller 15 which will cause engagement of the roller with the reaction face to cause reactive displacement of the roller for control of the belt position. By means of the adjustable mounting of the top wall 25, as previously described, the spacing and thereby the sensitivity of response of the self-aligning roller can be adjusted to meet desired performance criteria. If the spacing between the external wall 17 of the roller and the reaction face is relatively great, considerable lateral shift of the belt and consequent weight imbalance on the roller will be tolerated before the reactive force is imposed upon the roller to redirect the belt to true running position. Conversely, if the space between the wall 17 and the reaction face is relatively small, a much lesser extent of lateral shift of the belt and a lesser magnitude of weight imbalance will be sufficient to cause reactive displacement of the roller to a belt controlling position. For each conveyor installation, the operator can determine the degree of sensitivity of response required of the roller and adjust the spacing of the reactive face accordingly. It is desirable that only that degree of sensitivity of response be established as is necessary to accomplish the intended purpose of avoiding injury or damage to the belt 16. Ordinarily, the more sensitive the response setting of the reactive face, the greater is the frequency of contact of the roller with the face and there is consequently more wear on the parts. By setting the spacing of the top wall 25 at a dimension which will minimize the frequency of contact of the roller with the reactive face, while at the same time causing response prior to any damaging shift of the belt, a practicable level of effective operation and control is achieved.

As previously indicated, the top wall 25 of the abutment assembly provides the primary reaction face for angular displacement of the roller 15 in response to shift of the belt 16. However, there may be circumstances in which the side walls 24 of the abutment assembly also serve as reaction faces and are contacted by the ends of the roller 15. This may occur if there is a sudden shift of the belt which would create a sudden and highly leveraged reaction force on the end of the roller when it contacts the reaction face and displace it sufficiently to bring it into contact with one of the side walls 24. Conceivably, it could also occur when the belt not only shifts laterally but also somewhat angularly so as to cause swivel movement of the ends of the self-aligning roller into contact with one of the side walls 24 before there has been sufficient weight imbalance created on the roller to cause contact of the roller and with the reactive face provided by the top wall 25. Although such instances would not ordinarily be frequent, their possibility must be recognized. For this reason, the spacing of the side walls 24 from the surface of the roller 15 is such that the end of the roller will contact one or the other of the side wall surfaces before it reaches the limit of rotation which is built into the self-aligning bearing 21. Thus, in addition to acting as secondary reaction faces for control of the self-aligning roller, the side walls 24 also serve as restraining abutments to prevent overload of the bearing 21 beyond its operable limits of swivel movement.

In the above described embodiment of the invention, the abutment assembly 22 has been illustrated as presenting a pair of reaction faces with one of these faces adjacent one end of the roller and the other of the faces adjacent the opposite end of the roller and both in overlying relationship to the surface of the roller. In FIG. 7 of the drawings, a modified form of the invention is shown in which the pair of reaction faces are both presented adjacent the same single end of the roller rather than being disposed at opposite ends of the roller 15, as previously described. In the embodiment of FIG. 7, an abutment assembly 22a includes the end wall 23, the side walls 24 and the top wall 25, as previously described. In addition thereto, there is also provided a bottom wall 30 which is adjustably secured to the end wall 23 in spaced relationship to the surface of the roller 15 in the same manner as the top wall 25. The bottom wall 30 is provided with a removable high friction surface 28 and provides a second reactive face for the roller 15 disposed diametrically opposite the reactive face provided by the top wall 25 and at the same end of the roller 15.

When utilizing this modified form of abutment assembly 22a, the principle of sensing and control of the self-aligning roller 15 is as previously described. When a shifting of the belt 16 causes an imbalance of weight on the self-aligning roller, there is a leveraged force which acts upon the end of the roller, shown in FIG. 7, to either elevate it into contact with the reactive face provided by the top wall 25 or lower it into contact with the reactive face provided by the bottom wall 30. When the end of the roller is elevated into contact with the upper reactive face of the wall 25, there is a reactive force imposed upon it which displaces it in a direction opposite to the direction of travel of the belt 16 and thereby displaces it angularly to a control position for restoring the travel of the belt to a running true position, all as previously described. When there is a shift of the belt 16 which causes downward movement of the end of the roller into contact with the reaction face provided by the bottom wall 30, there is a reaction force imparted to the end of the roller which causes it to be angularly displaced in a direction which is the same as the direction of travel of the belt 16. Such angular displacement of this end of the roller is the same as and equivalent to the angular displacement of the roller which occurs in the previously described embodiment of the invention when the opposite end of the roller is elevated into reactive abutment with the reaction face provided by the top wall 25, accompanied by a corresponding tilting or lowering of that end of the roller which is illustrated in FIG. 7.

In FIG. 8 there is illustrated another modification of the invention in which the high friction surface 28a is associated with the external surface of the roller 15, rather than being presented by the pair of reaction faces of the abutment assembly. In this form, the high friction element is in the form of an annulus which is suitably secured circumferentially on one or both ends of the self-aligning roller 15. If the form of abutment assembly 22a described by reference to FIG. 7 is utilized, then only the one adjacent end of the roller need be provided with the peripheral high friction surface 28a. If the previously described form of abutment assembly 22 is utilized with each of the pair of reaction faces being adjacent opposite ends of the roller, then the peripheral high friction surface 28a can be provided on each end of the roller 15. The principle of operation of the described embodiments remains the same whether the high friction surface is presented at one or both ends of the roller or is presented by the reaction faces of the abutment assembly.

Although, in the foregoing description of the embodiments of the invention, I have illustrated and referred to a single direction of travel of the belt 16 and a corresponding rotation of a single self-aligning idler roller 15, it will be understood that the described form of self-aligning roller could also be any one or more of the load-carrying idler rollers 14 and that it could be applied to more than one of the return idler rollers 15, depending upon the length of the conveyor and other pertinent factors. Either the pulley 12 or the pulley 13 could also be provided with a self-aligning characteristic, as herein described, so I do not intend that the use of the term "roller" in the claims shall be limited to the return idler rollers or the load-carrying idler rollers but shall include both forms of rollers as well as those rollers which are normally designated as pulleys. Furthermore, it is an important characteristic of the described invention that the self-aligning roller and its principles of operation are equally effective regardless of the direction of travel of the endless belt 16. No adjustment or modification or change in the structure of the self-aligning roller or its mounting need be made if the direction of travel of the belt is reversed at any time or from time to time.

It is to be understood that the forms of my invention, herewith shown and described, are to be taken as preferred examples of the same and that various changes in the shape, size and arrangement of parts may be resorted to, without departing from the spirit of my invention, or the scope of the subjoined claims.

Having thus described my invention, I claim:

1. In a roller assembly for a belt conveyor, the combination of a tubular belt-supporting roller mounted for axial rotation about a fixed axle having an axis normal to the direction of belt travel and free of any underlying roller-support structure, a non-resilient self-aligning spherical bearing mounted on said axle and carried wholly internally of said roller to provide a unitary rotating journal means centrally of said roller permitting dynamic universal pivotal angular displacement of said roller in any direction relative to the nominal axis of rotation defined by said axle while supporting said roller for true axial rotation about its own axis in any position thereof, an abutment assembly associated with said roller and presenting a pair of reaction faces spaced from each other for opposite reaction effects upon said roller, said reaction faces being spaced from said roller in the path of angular displacement thereof when said belt is running true, one or the other of said faces being engageable by said roller in response to belt-induced angular displacement of said roller to cause said rotating roller to be reactively displaced in a direction to restore said belt to running true in either direction of belt travel, and said abutment assembly being disposed in the path of universal angular displacement of said roller to limit the maximum extent of said displacement in every direction thereof.

2. A combination as defined in claim 1, wherein said roller is angularly displaced from its nominal axis of rotation in response to lateral displacement of the belt from running true.

3. A combination as defined in claim 2, wherein said lateral displacement of the belt causes an imbalance of weight on one end of said roller to displace it downwardly relatively to the other end of said roller which is displaced upwardly.

4. A combination as defined in claim 1, wherein said reaction faces are operatively spaced from the external surface of said roller.

5. A combination as defined in claim 4, wherein one of said pair of reaction faces is adjacent one end of the roller and the other of said pair of reaction faces is adjacent the other end of said roller.

6. A combination as defined in claim 4, wherein said pair of reaction faces is mounted in diametrically opposed relationship to one end of said roller.

7. A combination as defined in claim 4, including means for selectively adjusting the spacing between said reaction faces and said roller.

8. A combination as defined in claim 1, including a high friction surface presented between said roller and each of said pair of reaction faces.

9. A combination as defined in claim 8, wherein said high friction surface is presented on said reaction faces.

10. A combination as defined in claim 8, wherein said high friction surface is presented on said roller.

* * * * *